United States Patent [19]
Smith

[11] Patent Number: 5,770,250
[45] Date of Patent: Jun. 23, 1998

[54] CONFECTION ON A STICK AND ASSOCIATED DRIP ABSORBER

[76] Inventor: Wanda K. Smith, P.O. Box 562, Stanton, Mich. 48888

[21] Appl. No.: 791,036

[22] Filed: Jan. 29, 1997

[51] Int. Cl.⁶ .................................................. A23G 9/00
[52] U.S. Cl. ............................ 426/134; 426/91; 206/204
[58] Field of Search ....................... 426/134, 91; 206/204

[56] References Cited

U.S. PATENT DOCUMENTS

| | | |
|---|---|---|
| 1,455,870 | 5/1923 | Fierheller . |
| 1,652,789 | 12/1927 | Moore . |
| 1,720,190 | 7/1929 | Van Horne . |
| 1,761,703 | 6/1930 | Brimer .................................. 426/134 |
| 1,782,813 | 11/1930 | Ferriera . |
| 2,321,519 | 6/1943 | Rubinoff . |
| 2,632,708 | 3/1953 | Sueskind . |
| 2,677,615 | 5/1954 | Sueskind ................................ 426/134 |
| 2,803,550 | 8/1957 | Ackalusky . |
| 2,927,544 | 3/1960 | Kolander . |
| 2,948,452 | 8/1960 | Grogan et al. . |
| 3,088,643 | 5/1963 | Dunn . |
| 3,459,296 | 8/1969 | Berg . |
| 4,239,175 | 12/1980 | Straubinger . |
| 4,321,997 | 3/1982 | Miller ..................................... 206/204 |
| 4,720,410 | 1/1988 | Lundquist et al. ...................... 206/204 |
| 4,756,939 | 7/1988 | Goodwin ................................ 206/204 |
| 4,770,920 | 9/1988 | Larsonneur ............................. 206/204 |

FOREIGN PATENT DOCUMENTS

| | | | |
|---|---|---|---|
| 2696157 | 4/1994 | France ................................... | 206/204 |

*Primary Examiner*—Steven Weinstein
*Attorney, Agent, or Firm*—Rader, Fishman, Grauer & McGarry

[57] ABSTRACT

The invention relates to an article for absorbing drips while consuming a frozen treat, and more particularly a device which can be axially received on an end of a stick and slid upwardly adjacent to a lower end of a frozen portion of the treat. In the preferred embodiment, the drip-absorbing article comprises a first absorbent member which encloses a second absorbent member. As drips fall from the frozen treat, the absorbent members absorb the drips and prevent contact with a user's hands and/or clothing. Additionally, as the frozen treat is consumed by the consumer, the article can be used to push the remaining portion of the frozen treat upwardly so that the consumer does not have to insert the stick handle into her mouth, which can be dangerous to children, nor eat the frozen treat from the sides, which generally results in the frozen treat falling off its stick.

9 Claims, 3 Drawing Sheets

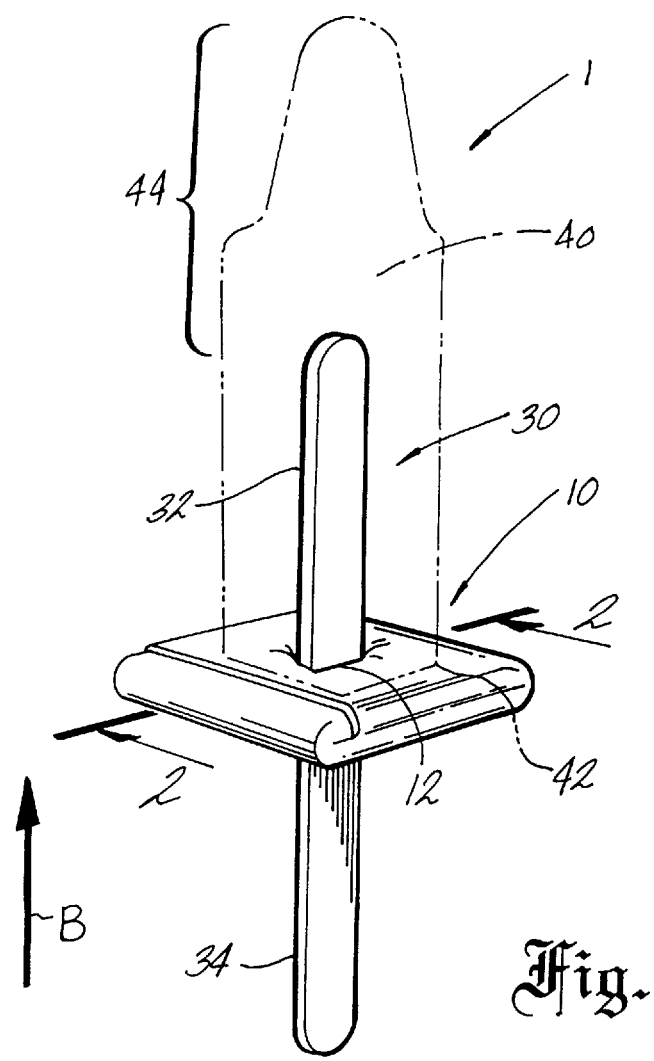
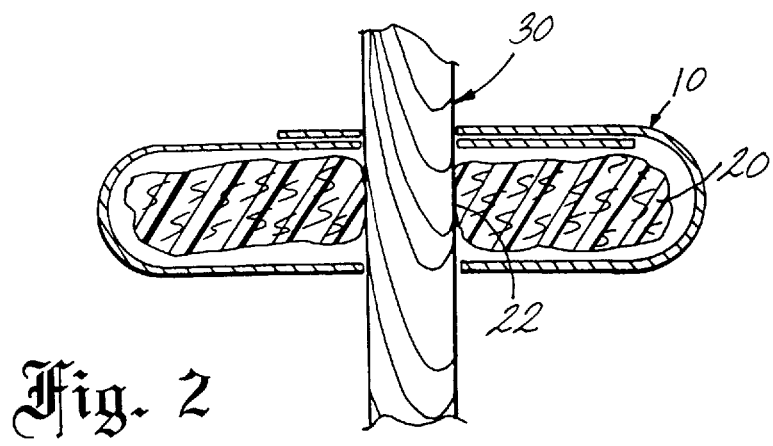

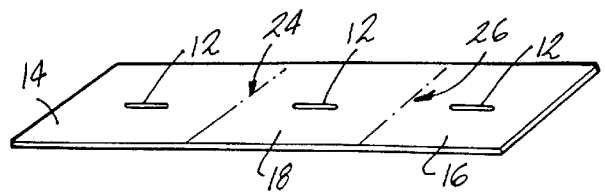
Fig. 3
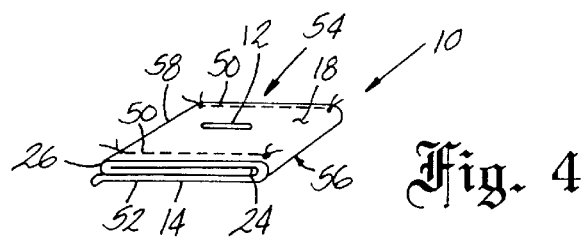
Fig. 4
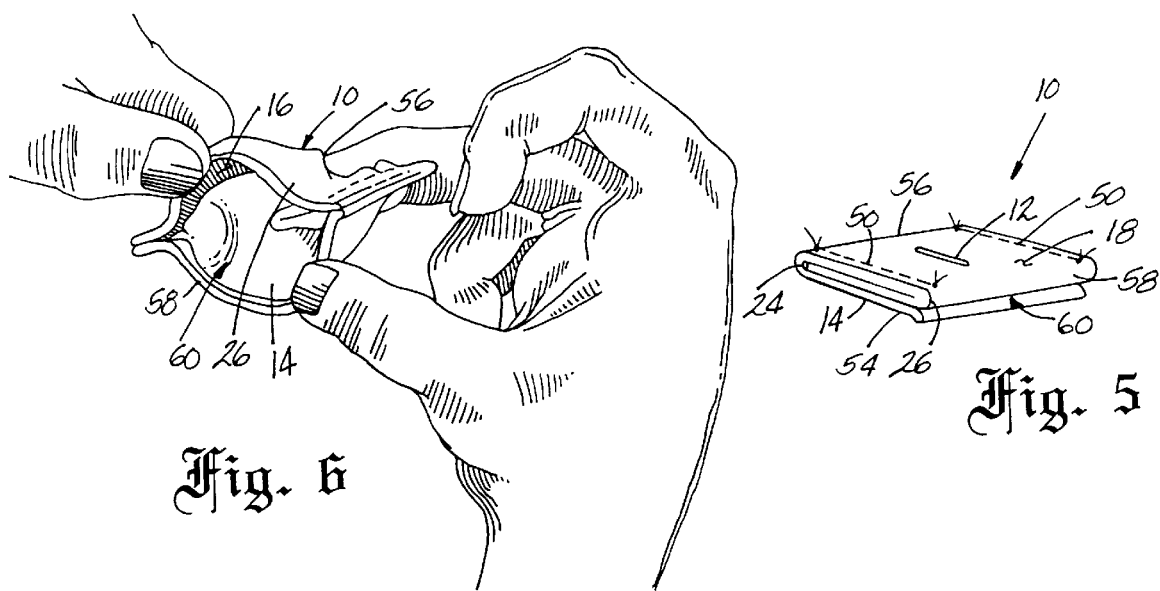
Fig. 5
Fig. 6
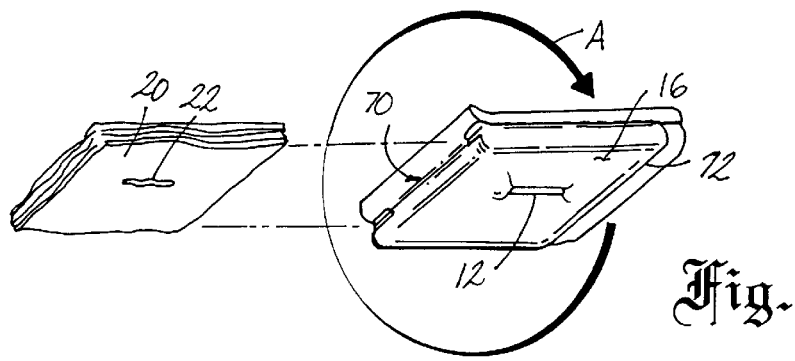
Fig. 7

CONFECTION ON A STICK AND ASSOCIATED DRIP ABSORBER

BACKGROUND OF THE INVENTION

1. Field of the Invention

This invention relates to a device for absorbing drips from a frozen confection treat, and more specifically, a device which can be axially received on an end of a stick for a frozen treat and slid upwardly adjacent a lower end of a frozen portion of the treat for absorbing drips from the melting treat.

2. Description of the Related Art

Frozen treats have long been known in the art. A frozen treat consists of an elongated block of ice cream, ice, frozen sherbet and the like formed around a stick, usually made of wood or plastic. The stick is held in a person's hand while the treat is being eaten. For example, U.S. Pat. No. 2,927,544 to Kolander describes a method of forming a frozen confection on a stick. An inherent problem with frozen treats of this type is that they tend to melt and drip while they are being consumed. Most often the frozen treat melts and drips onto the hands of a consumer and can cause the consumer's hands and/or clothing to become sticky and messy. Several attempts have been made to prevent this problem, but none have been successful at stopping drips from spilling onto a consumer while providing convenient consumption and keeping costs to consumers low.

Several attempts have been made to correct the problem of the frozen treat melting onto the consumer's hands and/or clothing.

U.S. Pat. No. 2,948,452 to Grogan et al. issued Aug. 9, 1960, describes a molded plastic device designed to hold an ice cream cone and catch melted materials.

U.S. Pat. No. 2,803,550 to Ackalusky issued Aug. 20, 1957, describes a guard device for frozen confections comprising a panel having an upwardly-extending perimetrical wall and a slit located in the center thereof. A rectangular block of sponge rubber is mounted to the panel. The block has a slit which is aligned with the slit in the panel so as to receive a stick of a frozen confection. The block absorbs melted liquid from the confection which attempts to leak between the stick and the slit in the panel. The upstanding walls and panel accumulate liquid that runs off the frozen treat which can later be discarded.

U.S. Pat. No. 4,239,175 to Straubinger issued Dec. 16, 1980, describes a drip-catching device for a frozen confection comprising a bowl having a handle and a straw which allows consumers to drink the liquid which melts off of the frozen confection.

U.S. Pat. No. 3,088,643 to Dunn, issued May 7, 1963, describes a cover or closure for a confection-freezing apparatus, in which the cover doubles as a dripguard.

Other examples of drip-catching devices are disclosed in U.S. Pat. Nos. 1,652,789 to Moore, 1,720,190 to Van Horne, 1,782,813 to Ferriera, 2,321,519 to Rubinoff, 2,632,708 to Sueskind, and 3,459,296 to Berg.

The efforts to provide protection from the drippings by means of a paper receptacle having a slit therethrough in which the stick of the frozen treat is inserted, or by means of a paper plate similarly apertured to receive the stick or handle generally impede the consumption of the treat, and can be difficult to remove. More importantly, they prevent the treat from being conveniently and completely consumed because the consumer must tip the frozen treat at an angle once the top portion is eaten. Even in the case of those articles which act to prevent drippings at all, after a short interval, the wrapper or guard article can become limp and soggy and tears apart while the person is still in the midst of eating the treat, thereby spilling whatever drippings had been accumulated.

When the receptacle is a rigid body designed to collect drippings from the frozen confection, the consumer must be careful not to tip the treat sideways or suffer the consequences of spilled meltings. Often, this mess can be worse than if no guard at all had been used. Also, in the case of somewhat permanent structures typically attached to the stick, the seal between the stick and the receptacle may not be tight enough to prevent drippings from coming down the stick and onto the consumer's hands or clothes. Even where an absorbing sponge is used, its absorption volume is likely insufficient to prevent the drippings from similarly traveling down the stick and onto the consumer's clothes and hands. Further, several prior art devices do not permit the drip-catching device to be reused and/or cleaned.

SUMMARY OF THE INVENTION

This invention overcomes the limitations of the prior art by providing a drip-absorbing article for use while consuming a frozen treat. The invention restores the convenient enjoyment of frozen treats without the hindrance of drips getting on the consumer and the frozen confection falling off the stick. The frozen treat comprises a frozen confection mounted on a stick wherein the stick has a first end embedded in the frozen confection and an exposed second end intended to be held by a user.

In one aspect of the invention, a drip-absorbing article for use with a preformed frozen treat is provided which comprises a first absorbent member having opposed top and bottom surfaces which define a pocket therebetween and a second absorbent member which is disposed in the pocket. A slit extends through the top surface of the first absorbent member, the second absorbent member, and the bottom surface of the first absorbent member. The drip-absorbing article can receive the second end of the stick so that the drip-absorbing article is located adjacent the frozen confection to absorb liquid melting from the frozen confection.

The first-absorbing member is preferably formed of polyester. The first-absorbing member can have an opening into the pocket. The first-absorbent member can comprise a panel having first, second, and third portions wherein the first and second portions define a pocket and the third portion defines a flap. The flap can have an outer end which is positioned adjacent one of the first and second portions of the panel whereby the flap wholly closes the opening in the first absorbing member. The pocket can be formed on at least two sides by stitching along edges of the first and second portions of the panel. The second absorbing member preferably comprises a sponge. The second absorbing member can further comprise an antibacterial sponge. The slit and the stick can be generally complementary so that the slit contacts the stick and retards axial movement of the stick when the stick is received in the slit.

In another aspect of the invention, an improved preformed frozen treat is provided which has a similar drip-absorbing member mounted thereon.

BRIEF DESCRIPTION OF THE DRAWINGS

The invention will now be described with reference to the drawings in which:

FIG. 1 is a perspective view of a drip-absorbing article axially received on a frozen treat stick handle adjacent a lower end of a frozen confection according to the invention;

FIG. 2 is a fragmentary cross-sectional view of the drip-catching article taken along lines 2—2 of FIG. 1 showing only the article and a portion of the stick with the remaining elements of the frozen treat removed for clarity;

FIG. 3 is an exploded view of the absorption sponge cover for the article shown in FIG. 1;

FIG. 4 is a perspective view of the absorbent cover depicted in FIG. 3 shown folded and stitched;

FIG. 5 is a mirror-image of the perspective view of the absorbent cover depicted in FIG. 4;

FIG. 6 is a perspective view of an assembler's hands turning the folded and stitched cover inside out;

FIG. 7 is an exploded view of the cover prior to insertion of the absorbent sponge.

DETAILED DESCRIPTION OF THE PREFERRED EMBODIMENTS

Figure 8:
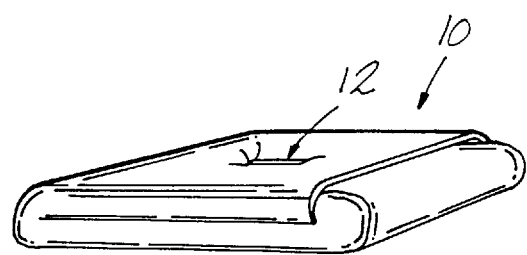
FIG. 8 is a perspective view of the assembled article of FIG. 1 with the stick handle and frozen confection removed for clarity.

Referring now to the drawings and to FIGS. 1 and 2 in particular, a drip-absorbing article for use while consuming frozen treats is shown generally as 1. The article 1 comprises a pair of absorbent members shown as a cover 10 which surrounds a sponge 20.

A slit 22 in the sponge 20 is aligned with a slit 12 in the cover 10. The slits 12 and 22 extend through the cover 10 and the sponge 20, respectively, and are adapted to receive a portion of a stick handle 30 which is embedded in a frozen treat 40, shown by a phantom outline in FIG. 1. The stick handle 30 has a first end 32 and a second end 34. The first end 32 of the stick handle 30 is embedded in a volume of the frozen treat 40. The second end 34 is exposed and intended to be grasped by a consumer (not shown). The alignment of the slits 12 and 22 enables a consumer (not shown) of the frozen treat 40 to slide the article 1 axially along the stick handle 30 to a point adjacent a base 42 of the frozen treat 40 to catch any drips melting (not shown) therefrom.

The absorbent sponge 20 is preferably of sufficient cross-sectional area to create a barrier between the frozen treat 40 and a consumer's hand (not shown) by absorbing the melted run-off from the frozen treat 40. It has been found that a typical sponge, such as those made by 3M Corporation provides excellent results. The sponge 20 and cover 10 have preferably not been put through any antibacterial treatment so as to prevent the contact of any harmful substances, such as the antibacterial substances in some sponges, with the frozen confection or a consumer's mouth. The cover 10 is preferably made from an absorbent fabric such as polyester. It has been found that Trevira polyester, or "Doe Suede," provides excellent results. Other materials may be used for the cover 10 and sponge 20 which are ideally non-toxic and machine washable, so that the drip-absorbing article 1 can be sanitized and reused. It will be understood that the cover 10 and sponge 20 can also be selected from disposable materials, such as a paper or pulp base, so that they can be easily disposed and/or recycled after use.

As shown in FIG. 3, the cover 10 is shown as a rectangular member having perimetrical edges 36, 38, 46, and 48. Opposed longitudinal edges 36 and 38 are parallel to a longitudinal axis of the cover 10 and opposed edges 46 and 48 are perpendicular to the longitudinal edges 46 and 48 and parallel to a transverse axis of the cover 10. The cover 10 is folded along a first fold 24 and a second fold 26, each fold represented by dotted lines in FIG. 3, thereby dividing the cover 10 into a first portion 14, a second portion 16, and a third portion 18. The first and second portions 14 and 16 are of approximate equal length, and the third portion 18 is of slightly lesser length.

First, the third portion 18 is folded at the second fold 26 over the second portion 16. Next, the first portion 14 is folded at the first fold 24 over both the third portion 18 and the second portion 16, whereby the third portion 18 is located between first and second portions 14 and 16, as best seen in FIGS. 4 and 5.

The folding of the cover 10 produces a rectangular member with perimetrical ends 52, 54, 56 and 58 as shown in FIGS. 4–6. The ends 52 and 54 are oppositely located along the longitudinal axis of the cover 10 and ends 56 and 58 are oppositely located perpendicular thereto. The end 56 of the folded cover 10 comprises the fold 24 and the end 58 of the folded cover 10 includes an opening 60 located between the edge 46 and the fold 26. The end 52 of the folded cover 10 comprises the longitudinal edge 36 of the unfolded cover 10, as shown in FIG. 3, folded onto itself and the end 54 of the folded cover 10 comprises the longitudinal edge 38 of the unfolded cover 10, as shown in FIG. 3, folded onto itself.

First, second, and third portions 14, 16, and 18 are fastened together along ends 52 and 54 of the cover 10 by stitching 50. The stitching 50 is preferably a 100% mercerized cotton covered polyester stitching.

The end 56 of the cover 10 is pushed between the third portion 18 and the first portion 14, and out the opening 60 at the end 58 by an assembler's hands 80, whereby the cover is turned inside out, as shown by FIG. 6.

As illustrated by FIG. 7, a pocket 70 is formed between the first and second portions 14 and 16 which is defined on longitudinal sides by ends 52 and 54 fastened together by the stitching 50 and, transversely, on the end 56 by the fold 24. The end 58, which is opposite the end 56, defines an opening 74 into the pocket 70. The opening 74 is bordered by the fold 26 and the edge 46 of the cover 10.

The sponge 20 is then inserted into the pocket 70 in the cover 10, as shown in FIG. 7. Once the sponge 20 is fully inserted in the pocket 70, a flap 72 defined by the third portion 18 is pulled over the opening 70, in the direction of Arrow A in FIG. 7, to cover the opening 74 to the pocket 70, whereby the sponge 20 is wholly enclosed by the cover 10. The final position of the flap 72 is shown in FIGS. 2 and 8. Once fully secured, the slit 12 through the cover 10 and the slit 22 through the sponge 20 can be made. Alternatively, the slits 12 and 22 through the cover 10 and the absorbent sponge 20, respectively, can be made before the sponge 20 is inserted into and encased by the cover 10.

In operation, the aligned slits 12 and 22 of the cover 10 and the sponge 20, respectively, can axially receive the second end 34 of the stick handle 30 opposite the first end 32 which is embedded in the frozen treat 40. The drip-absorbing article 1 is then slid axially along the stick handle 30, in the direction of Arrow B in FIG. 1, adjacent the base 42 of the frozen treat 40.

After a top portion 44 of the frozen treat 40 has been consumed, the drip-absorbing article 1 can be slid axially toward the first end 32 so that the remainder of the frozen treat 40 slides the stick handle 30, in the direction of Arrow B in FIG. 1. As a result, the first end 32 of the stick handle 30 does not protrude beyond the top portion 44 of the frozen treat 40 allowing easier consumption of the remainder of the frozen treat 40 without having to place the first end 32 of the stick handle 30 into the consumer's mouth, which can be particularly dangerous for children. Moreover, the consumer need not resort to tipping the frozen treat 40 at an angle in order to consume the remainder of the frozen treat 40 to avoid the first end 32 of the stick handle 30, which prevents all or part of the frozen treat 40 from falling off the stick handle 30.

In addition, the drip-absorbing article 1 can be moistened and frozen so that it may be used as a teether for infants. Also, the drip-absorbing article 1 can be used as an ice-pack on bumps and scrapes.

Reasonable variation and modification are possible within the spirit of the foregoing specification and drawings without departing from the scope of the invention.

The embodiments for which an exclusive property or privilege is claimed are defined as follows:

1. In a preformed frozen treat comprising a frozen confection mounted on a stick, the stick having a first end being embedded in the frozen confection and a second end being intended to be held by a user, the improvement comprising:

a first absorbent member having opposed top and bottom surfaces defining a pocket therebetween;

a second absorbent member being disposed in the pocket; and a slit, dimensioned to receive the stick, said slit extending through the top surface of the first absorbent member, the second absorbent member, and the bottom surface of the first absorbent member;

the drip-absorbing article receiving the second end of the stick through said slit so that the drip-absorbing article is located adjacent the frozen confection to absorb liquid melting from the frozen confection.

2. The preformed frozen treat according to claim 1 wherein the first absorbent member is formed of polyester.

3. The preformed frozen treat of claim 1 wherein the first absorbent member has an opening into the pocket.

4. The preformed frozen treat of claim 3 wherein the first absorbent member further comprises a panel having first, second, and third portions;

the first and second portions defining the pocket; and the third portion defining a flap.

5. The preformed frozen treat of claim 4 wherein the flap has an outer end, the outer end being positioned adjacent one of the first and second portions of the panel whereby the flap wholly closes the opening in the first absorbent member.

6. The preformed frozen treat of claim 4 wherein the pocket is formed on at least two sides by stitching along edges of the first and second portions of the panel.

7. The preformed frozen treat of claim 1 wherein the second absorbent member comprises a sponge.

8. The preformed frozen treat of claim 1 wherein the second absorbent member comprises an antibacterial sponge.

9. The preformed frozen treat of claim 1 wherein the slit and the stick are generally complementary so that the slit contacts the stick and retards axial movement thereof when the stick is received in the slit.

* * * * *